United States Patent [19]
Friedland

[11] 3,772,877
[45] Nov. 20, 1973

[54] TEMPERATURE RESPONSIVE ACTUATOR
[75] Inventor: Harry Friedland, Las Vegas, Nev.
[73] Assignee: Process Systems, Inc., Las Vegas, Nev.
[22] Filed: Feb. 4, 1971
[21] Appl. No.: 112,754

[52] U.S. Cl. .................. 60/531, 73/368.2, 236/86, 236/99
[51] Int. Cl. ............................................ F03g 7/06
[58] Field of Search .................. 236/99, 100, 86; 73/368.3, 368, 368.2; 60/25; 337/114, 306

[56] References Cited
UNITED STATES PATENTS

| | | | |
|---|---|---|---|
| 1,612,246 | 12/1926 | Whittingham | 60/25 UX |
| 1,547,632 | 7/1925 | Wensley | 60/25 UX |
| 2,078,108 | 4/1937 | Torrey | 236/92 |
| 2,392,613 | 1/1946 | Persons | 337/306 X |
| 853,504 | 5/1907 | Eddy | 236/99 X |
| 2,798,764 | 7/1957 | Ray | 73/368.2 X |
| 3,163,045 | 12/1964 | Kaveckas et al. | 73/368.3 X |
| 3,434,351 | 3/1969 | Poitras | 73/368.2 |

Primary Examiner—William E. Wayner
Attorney—Christie, Parker & Hale

[57] ABSTRACT

An elongated filler rod is disposed inside an enclosed hollow elongated probe. The filler rod is spaced from the probe to form an annular cavity that is partially filled with a volatile liquid having a higher heat capacity per unit volume than the filler. The temperature of the liquid is indicated by a movable member that is responsive to the vapor pressure of the liquid in the cavity. A flange at one end of the filler rod serves as a seal at the threaded connection between the probe and the housing for the movable member. First and second actuating stages are connected in tandem. The first actuating stage is triggered by the movable member and the second actuating stage is triggered by the first actuating stage. Each stage has a snap-action operation accelerated by a rapid change in fluid pressure. The second stage has to be reset before it can be triggered again.

10 Claims, 4 Drawing Figures

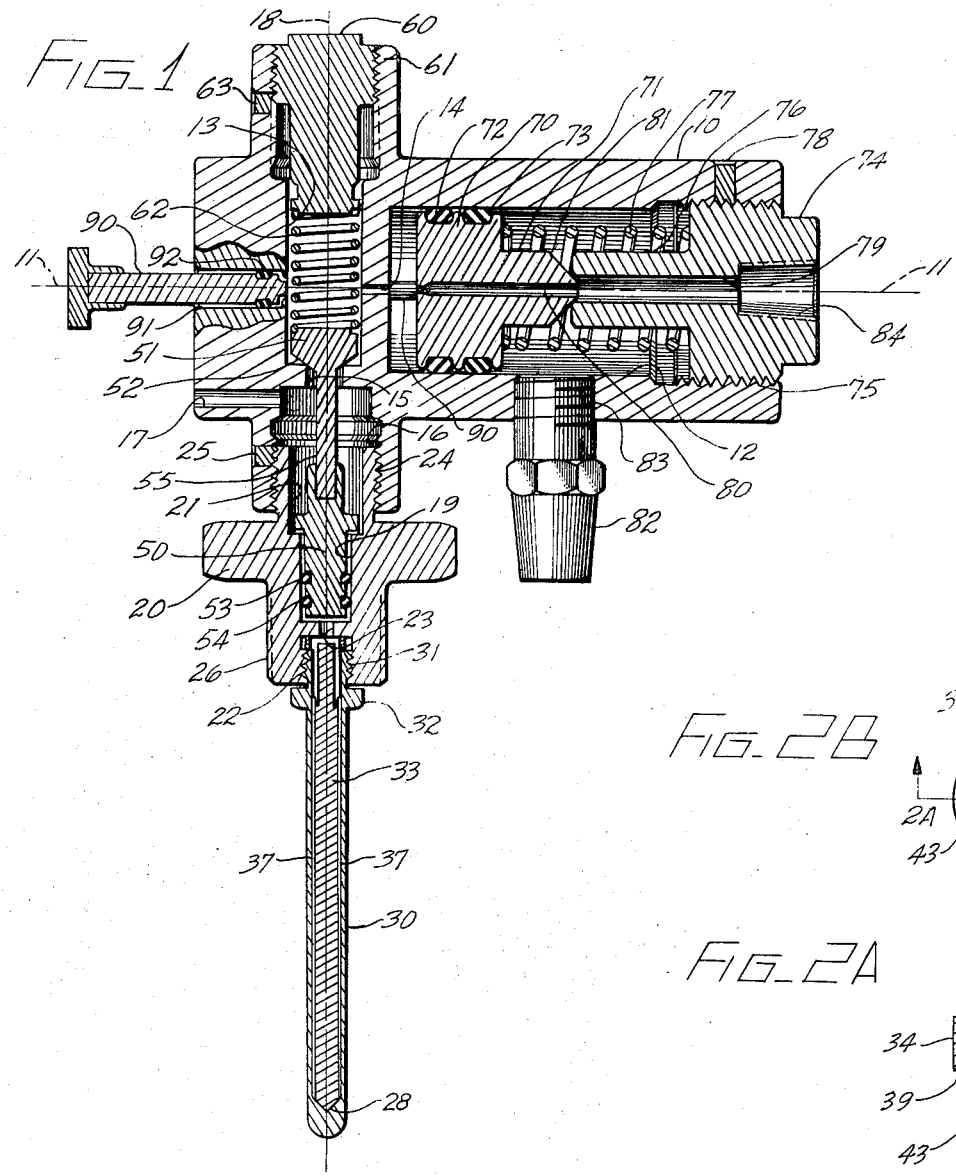
FIG_1
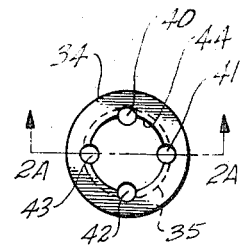
FIG_2B
FIG_2A
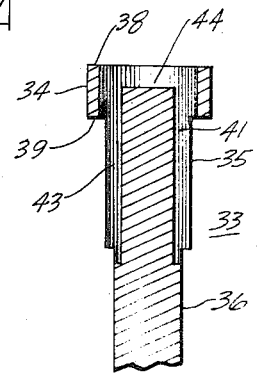
FIG_3
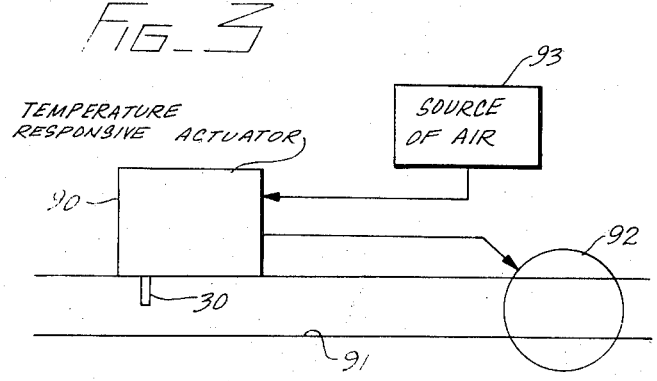
INVENTOR.
HARRY FRIEDLAND
BY
Christie, Parker & Hale
ATTORNEYS

TEMPERATURE RESPONSIVE ACTUATOR

BACKGROUND OF THE INVENTION

This invention relates to temperature responsive actuators and, more particularly, to arrangements for improving the speed of response of such an actuator.

Generally speaking, there are three types of temperature responsive actuators that employ a probe as a temperature sensing element. The first type, typified by Malone et al, U.S. Pat. No. 3,166,247, exploits differences in the coefficient of expansion of two materials. A thermally nonresponsive rod is disposed inside a hollow probe having a large positive coefficient of expansion. The ends of the rod bear against the extremity of the probe and an actuator, respectively. As the probe expands with temperature increases, the rod withdraws from the actuator. The second type, typified by Houghton U.S. Pat. No. 2,798,689, is based upon the expansion of a liquid in a hollow probe responsive to an increase in temperature. A bellows is mechanically coupled to an actuator. The liquid completely fills the inside of the probe and the space around the bellows to compress the bellows as the liquid expands. The third type, typified by Puster et al, U.S. Pat. No. 3,105,637 and Weber U.S. Pat. No. 3,237,296 utilizes the known relationship between the temperature of a volatile liquid partially fills the space enclosed by a hollow probe. The position of a piston or bellows that communicates with the enclosed space indicates the pressure of the vapor and hence the temperature of the volatile liquid. In the Weber patent a capillary tube in which a filler wire is disposed couples the probe to the diaphragm; the filler wire minimizes the necessary amount of the liquid and compensates for ambient temperatures along the capillary tube.

The speed of response of the third type of temperature responsive actuator depends upon the rate of heat transfer from the probe to the volatile liquid, the heat capacity of the volatile liquid, and the heat required to vaporize the volatile liquid. When the diameter of the probe is enlarged to promote higher heat transfer to the volatile liquid, the quantity of liquid needed to fill the inside of the probe to any particular level and the space occupied by the vapor also increase. As a result, more heat is needed to raise the temperature of the volatile liquid and to vaporize enough of it to provide the equilibrium vapor pressure. In short, no significant improvement in the speed of response is achieved by enlarging the diameter of the probe.

In all three types of temperature responsive actuators, the actuating stages coupled to the probe also affect the speed of response. Conventionally fluidic and/or mechanical actuating stages are employed to boost the available output power. The speed of operation of these actuators is sometimes enhanced by providing a snap-action.

In some bistable applications of a temperature responsive actuator, it is desirable after a temperature limit is exceeded to latch up the actuator until it is reset. In this way, the fact that the temperature limit has been exceeded cannot after the temperature drops below the limit again be overlooked by the maintainance personnel for the system in which the temperature responsive actuator is employed.

SUMMARY OF THE INVENTION

According to one aspect of the invention, a filler material having a low heat capacity per unit volume is disposed inside an enclosed hollow elongated probe. A volatile liquid having a higher heat capacity per unit volume than the filler material partially fills the space enclosed by the probe to produce in the remainder of the space a vapor having a pressure characteristic of the temperature of the liquid. A movable member responsive to the vapor pressure in the cavity indicates the temperature of the liquid. The filler reduces the resultant heat capacity of the probe and permits the rate of heat transfer to the liquid to be significantly raised by enlarging the diameter of the probe, without a corresponding increase in the quantity of liquid inside the probe or the space occupied by the vapor. Consequently, the equilibrium vapor pressure in the cavity changes more quickly responsive to temperature changes outside the probe and an improvement in the speed of response of the actuator results. Preferably, the filler is a solid elongated rod that forms an annular cavity with the probe and the liquid is disposed in the annular cavity. This configuration promotes high heat transfer due to the large area of the interface between the probe and the liquid and due to the radial thinness of the annular liquid layer.

A feature of this aspect of the invention is the provision of a flange at the end of the filler to seal a threaded connection between the probe and a housing in which the movable member is disposed. This permits replacement of the probe without replacement or recalibration of the movable member. A significant reduction in the replacement cost of the probe and the associated labor ensues.

According to another aspect of the invention, a first actuating stage and a second actuating stage are connected in tandem with the movable member that indicates the temperature of the probe. The operation of both stages is accelerated by fluidically created snap-action. The first stage comprises a chamber with an opening at one end and a movable plug adapted to seal the opening. The movable member is mechanically coupled to the plug to unseal the opening when the temperature of the probe rises above a predetermined value. A source of actuating fluid under pressure is coupled by a supply conduit to the chamber. The supply conduit is sufficiently small that the fluid in the chamber vents through the opening when the plug is unsealed much faster than the fluid from the source is supplied to the chamber. This gives rise to a pronounced snap-action. A snap-action is produced in the second stage by means of the same principle.

Another aspect of the invention involves a second actuating stage in which the snap-action is further enhanced and a reset is required before the stage can be retriggered. The second stage comprises a chamber with an opening at one end through which actuating fluid under pressure from the source is supplied. A conduit extends through a plug that is adapted to seal the opening so the fluid is supplied to the other end of the chamber when the plug seals the opening. The supply conduit for the first stage enters the chamber at its other end. When the fluid pressure at the other end of the chamber drops sufficiently, the plug unseals the opening. The pressure of the fluid passing through the opening is then exerted over the entire area of one side of the plug. The sudden increase in force enhances the snap-action. Preferably, the opening is larger than the conduit through the plug. A resetting plunger is adapted to move the plug from the other end of the chamber to seal the opening. Since the fluid is supplied to the other end of the chamber through the opening and the plug conduit, the space at the other end of the chamber cannot become pressurized until the plunger moves the plug to seal the opening and reestablish the fluid supply.

BRIEF DESCRIPTION OF THE DRAWING

The features of a specific embodiment of the best mode contemplated of carrying out the invention are illustrated in the drawing, in which:

FIG. 1 is a side sectional elevation view of a temperature responsive actuator incorporating the principles of the invention;

FIGS. 2A and 2B are a partial side sectional view and a top plan view, respectively, of the filler rod shown in FIG. 1; and FIG. 3 is a schematic diagram of a fluid system utilizing the temperature responsive actuator of FIG. 1.

DETAILED DESCRIPTION OF THE SPECIFIC EMBODIMENT

In FIG. 1, a temperature responsive actuator has a generally cylindrical housing 10 disposed about a longitudinal axis 11. Housing 10 has a cylindrical cavity or chamber 12 disposed about axis 11 and a cylindrical cavity or chamber 13 disposed about an axis 18 that is perpendicular to axis 11. A conduit 14 disposed about axis 11 connects cavities 12 and 13. A port 15 disposed about axis 18 connects cavity 13 to a cylindrical cavity 16 also disposed about axis 18. A venting conduit 17 connects cavity 16 to the atmosphere outside housing 10. Conduit 14 has a substantially smaller cross-sectional area than port 15 or conduit 17; thus when port 15 is open fluid is vented from cavity 13 by conduit 17 at a much higher rate than it is supplied thereto by conduit 14.

A base 20 has disposed about axis 18 a bore 19, a counterbore 21 at one end, a bore 22 at the other end, and a port 23 that connects bores 19 and 22. At one end of base 20, male threads 24 engage matching female threads on the surface of cavity 16 to form a sealed threaded connection that is maintained by a set screw 25. At the other end, base 20 has male mounting threads 26 for securing the actuator in a fluid system. A hollow elongated cylindrical probe 30 is closed at one end and open at the other end. Male threads 31 at the open end of probe 30 form a threaded connection with matching female threads on the surface of bore 22. Probe 30 is disposed on axis 18. An elongated cylindrical filler rod 33 is disposed inside probe 30 to form a thin annular cavity 37 in the space between probe 30 and filler 33. The inside of the closed end of probe 30 and the adjacent end of filler rod 33 have matching conical surfaces that engage each other at 28 to align filler rod 33 axially with probe 30.

As depicted in FIGS. 2A and 2B, filler rod 33 has a flange 34, which rests on the open end of probe 30. Flange 34 is larger in diameter than port 23 and the inside of probe 30. A portion 35 of filler rod 33 directly below flange 34 is dimensioned to form a force fit with the inside of probe 30. The remaining portion 36 of filler rod 33, which occupies the space inside the temperature sensing portion of probe 30, has a smaller diameter than the inside of probe 30, thereby forming annular cavity 37. When the open end of probe 30 is screwed into bore 22, annular surface 38 of flange 34 bears against the end surface of bore 22 around port 23 and annular surface 39 of flange 34 bears against the open end surface of probe 30. Holes 40, 41, 42, and 43 extend longitudinally through flange 34 and region 35, and partially into region 36. A shallow cylindrical cavity 44 is formed at the end of flange 34 to connect the ends of holes 40 through 43. Surfaces 38 and 39 of flange 34 seal the threaded connection formed between probe 30 and base 20, while annular cavity 37 is coupled to port 23 by holes 40 through 43 and cavity 44.

The inside of probe 30 is charged with a volatile liquid such as propylethylene. The liquid partially fills the space enclosed by probe 30 and the vapor produced by the evaporation of the liquid fills the remainder of the enclosed space, the pressure of the vapor being a known function of the temperature of the liquid. Preferably, the volatile liquid fills probe 30 to the level of portion 35 of filler rod 33 so heat is transferred to the liquid over essentially its entire interface with the probe and so the space occupied by the vapor is small. The term "a volatile liquid" used in this specification is relative. In other words, virtually every substance is volatile at some temperature. Thus the term "volatile liquid" is used to mean a liquid that has a detectable change in vapor pressure in the temperature range of operation of the temperature responsive actuator. Filler rod 33 is made from a material, such as teflon or cork, with a lower heat capacity per unit volume than the volatile liquid. If flange 34 is to perform the described sealing function, teflon is preferable. The term heat capacity per unit volume refers to the amount of heat (e.g. calories) required to aise the temperature of a unit volume (e.g. one cubic inch) of the material. Filler rod 33 reduces the resultant heat capacity of the probe, i.e., the sum of the heat capacities of the entire mass comprising probe, volatile liquid, and filler rod, without impairing heat transfer.

A piston 50 rides in bore 19. At the top, piston 50 has a bore that forming a slip fit with a rod 55 that is slightly smaller than the bore. Rod 55 is integral with a plug 51 having a conical surface 52 adapted to seal port 15. Thus, plug 51 is connected to piston 50. O-rings 53 and 54 retained by annular grooves in the side surface of piston 50 seal the side wall of bore 19. The bottom surface of piston 50 is exposed by port 23 to the vapor pressure in annular cavity 37. In summary, the space inside bore 19 below piston 50 is part of the space enclosed by probe 30, and this space is completely sealed from the atmosphere and the rest of the actuator.

An end cap 60 having male threads 61 extends into cavity 13. The entrance of cavity 13 has matching female threads that form a sealed threaded connection with threads 61 of plug 60. A compression spring 62 is located in cavity 13 between cap 60 and plug 51. The force exerted by spring 62 on plug 51 is adjusted by varying the depth of penetration of end cap 60 into cavity 13. This adjustment which sets the temperature value where the actuator operates, is maintained by a set screw 63.

A piston 70 having a integral plug 71 rides in cavity 12. O-rings 72 and 73 retained by annular grooves in the surface of piston 70 seal cavity 12. An end cap 74 having male threads 75 at one end and a nose 76 at the other end extends into cavity 12. The entrance of cavity 12 has matching female threads that form a sealed threaded connection with threads 75 of end cap 74. A compression spring 77 is located between piston 70 and end cap 74. The force exerted on piston 70 by spring 77 is adjusted by varying the depth of penetration of end cap 74 into cavity 12. This adjustment is maintained by a set screw 78. A conduit 79 extends longitudinally through end cap 74 along axis 11. A smaller conduit 80 extends longitudinally through piston 70 along axis 11. At least a portion of conduit 80 has a substantially smaller cross-sectional area than conduit 14; thus when plug 52 is unsealed, fluid is vented from the end of cavity 12 by conduit 14 at a much higher rate than it can be replaced by conduit 80. A conical surface 81 on plug 71 is adapted to seal the end of conduit 79 thereby providing a direct sealed coupling from conduit 79 to conduit 80 when piston 70 is in its primed position as shown in FIG. 1. An actuating fluid such as air under pressure is supplied to conduit 79 via a threaded fitting 84 by a coupling (not shown). This actuating fluid flows through conduit 80 to pressurize the end of cavity 12, i.e., the portion of cavity 12 between piston 70 and conduit 14, and flows through conduit 14 to pressurize cavity 13 when plugs 71 and 51 seal their respective openings. A vent fitting 82 forms a threaded connection 83 with housing 10 to provide a passage for actuating fluid when the end of conduit 79 is not sealed by plug 71.

Before considering the mode of operation of the temperature responsive actuator of FIG. 1, reference is made to FIG. 3 for a typical application of this temperature responsive actuator in a fluid system. Block 90 represents the temperature responsive actuator. Probe 30 extends into a conduit 91 to sense the temperature of the fluid flowing therethrough. A fluid actuated, normally open valve 92 is connected in series with conduit 91. Air under pressure from a source is supplied to actuator 90. (With reference to FIG. 1, source 93 is coupled to fitting 84.) If the temperature of the fluid flowing through conduit 91 rises above a predetermined value, the air from source 93 is applied by actuator 90 to valve 92. (With reference to FIG. 1, the air supplied to conduit 79 flows through vent fitting 82.) The air drives valve 92 closed, thereby halting the flow of fluid through conduit 91. In summary, actuator 90 serves as a temperature relief valve that shuts down the fluid flow through the system when a dangerously high temperature level is exceeded.

For the purpose of explaining its operation, the temperature responsive actuator of FIG. 1 may be broken down into three principal elements: a temperature sensing element comprising probe 30 and piston 50; a first actuating stage comprising cavity 13, plug 51, and port 15; and a second actuating stage comprising piston 70, cavity 12, and conduits 79 and 80. The pressure of the actuating fluid in cavity 13 and spring 62 exert a downward force on plug 51. When the temperature of the fluid flowing past probe 30 exceeds a predetermined value, the vapor pressure in annular cavity 37 rises to a point sufficient to exert on the bottom surface of piston 50 an upward force that exceeds the downward force exerted on plug 51. At this point, the first actuating stage is triggered. It is to be noted that the equilibrium vapor pressure in annular cavity 37 is established very quickly when the temperature of the fluid outside probe 30 changes because of the high rate of heat transfer and the low resultant heat capacity. The high rate of heat transfer is attributable to the relatively large area of the interface between probe 30 and the volatile liquid in annular cavity 37 and to the radial thinness of the volatile liquid layer occupying cavity 37. The low resultant heat capacity is attributable to filler rod 33, which occupies much of the space inside probe 30.

Before the first actuating stage is triggered, cavity 13 is at the pressure of the source of actuating fluid supplied through conduit 79. As soon as the seal between surface 52 of plug 51 and port 15 is broken by the upward movement of piston 50, the pressure inside cavity 13 suddenly drops sharply because the actuating fluid in cavity 13 is vented to the atmosphere via port 15 and conduit 17 at a much faster rate than the actuating fluid is replaced through conduit 14. This sudden pressure drop in cavity 13 creates a corresponding increase of the upward force exerted on plug 51 to drive plug 51 above conduit 14 in a snap-action. The snap-action operation increases the speed of the response of the first stage.

Assuming that piston 70 is primed, i.e., in the position shown in FIG. 1, and plug 51 seals port 15, the end of cavity 12 is at the pressure of the source of actuating fluid. This pressure urges surface 81 against the end of conduit 79 to form a seal at the junction of conduits 79 and 80. After the first actuating stage is triggered and the pressure in cavity 13 drops, the pressure at the end of cavity 12 also begins to drop because actuating fluid escapes through conduit 14 at a faster rate than it is supplied through conduit 80. When the force exerted on piston 70 by spring 77 and the force exerted on surface 81 by the pressure of the fluid in conduit 79 exceed the force exerted on piston 70 by the pressure at the end of cavity 12, the seal between surface 81 and the end of conduit 79 is broken. At this point, the second stage is triggered. Thereupon, the actuating fluid begins to stream out of the end of conduit 79 and act against surface 81. The pressure of the fluid in conduit 79 then exerts a force over the entire surface of plug 71 and piston 70 on the side facing conduit 79. This increased force taken with the pressure reduction at the end of cavity 12 drives piston 70 against the end of cavity 12 in a snap-action. The actuating fluid then flows from conduit 79 to fitting 82.

When the temperature of the fluid outside probe 30 drops below the critical value, the actuating stages remain in their actuated state described in the two preceding paragraphs until the second actuating stage is primed or reset by moving piston 70 into the position shown in FIG. 1, and holding piston 70 in such position until cavity 13 and the end of cavity 12 are fully pressurized once again. Piston 70 is reset by a plunger 90. Plunger 90 extends through a hole 91 that is parallel to and offset laterally from axis 11. An O-ring 92 retained by a groove in the side of plunger 90 seals the space between hole 91 and plunger 90. The end of plunger 90 forms a force fit with a bore in piston 70 (not shown). To reset piston 70, plunger 90 is depressed to the position shown in FIG. 1 thereby moving piston 70 into the position shown in FIG. 1. When piston 70 is driven against the end of cavity 12 upon the triggering of the second actuating stage, plunger 90 is driven out of opening 91.

The described embodiment of the invention is only considered to be preferred and illustrative of the inventive concept; the scope of the invention is not to be restricted to such embodiment. Various and numerous other arrangements may be devised by one skilled in the art without departing from the spirit of the scope of this invention as set forth in the claims. For example, the described actuating stages can be employed with other types of temperature sensing probe arrangements and the described filler rod can be employed with a temperature sensing probe based on expansion of liquid rather than vapor pressure. Further, although it is preferable to form an annular cavity with the filler rod to reduce the resultant heat capacity of the probe, this can also be achieved by employing a filler in the form of solid particles or a liquid mixed with the volatile liquid.

What is claimed is:

1. A temperature responsive actuator comprising:
   a fluid medium, the temperature of which is to be monitored in a given region;
   a hollow elongated temperature sensing probe disposed in the given region of the fluid medium, one end of the probe being closed and the other end of the probe being open;
   a housing having a port communicating with the open end of the probe to enclose the space inside the probe;
   a threaded connection between the probe and the housing at the port;
   an elongated solid filler rod disposed inside the probe, the filler rod being spaced from the probe to form an annular cavity inside the probe;
   a flange formed on the end of the filler rod so as to seat between the probe and the housing at the port to seal the threaded connection between the probe and the housing;
   a passageway through the flange between the annular cavity inside the probe and the port;
   a volatile liquid partially filling the enclosed space to produce in the remainder of the space a vapor having a pressure characteristic of the temperature of the liquid; and
   means in the housing responsive to the vapor pressure in the annular cavity for monitoring the temperature of the fluid medium, the passageway through the flange and the port in the housing coupling the annular cavity inside the probe to the monitoring means.

2. The actuator of claim 1, in which the filler rod has a lower heat capacity per unit volume than the volatile liquid.

3. The actuator of claim 2, in which the monitoring means comprises a movable piston disposed in a bore inside the housing and means for coupling the port to the bore to permit the vapor to communicate with one side of the piston.

4. The actuator of claim 1, in which the threaded connection is formed within a threaded bore in the housing leading to the port, the flange is larger than the open end of the probe, and the flange bears against the end of the threaded bore nd surrounds the port and bears against the end of the probe as the threaded connection is made to seal the annular cavity and the port in the housing.

5. The actuator of claim 1, in which the closed end of the probe and the adjacent end of the filler rod have matching conical surfaces that engage each other to align the filler rod inside the probe.

6. The actuator of claim 1, additionally comprising a first actuating stage and a second actuating stage connected in tandem, the first actuating stage being coupled to the piston and the second actuating stage being coupled to the first actuating stage, each stage having a snap-action operation accelerated by a rapid change in fluid pressure.

7. A temperature responsive control device comprising:
   a bulb having a hollow elongated interior, a closed end and an open end;
   an elongated solid filler rod disposed in the hollow interior of the bulb, the filler rod being spaced from the bulb all around the interior to form an annular cavity inside the bulb, the filler rod having a flange at the open end of the bulb;
   a fluid occupying the annular cavity inside the bulb, the filler rod being made of a material having a lower heat capacity per unit volume than the fluid;
   a movable member; and
   means for coupling the fluid inside the bulb to one surface of the member to move it responsive to the pressure of the fluid, the coupling means comprising a threaded connection between which the flange is disposed to seal the connection and one or more passages formed in the flange to permit fluid from the annular cavity inside the bulb to communicate with the one surface of the member.

8. The control device of claim 7, in which the fluid is a volatile fluid, the liquid form of the fluid only partially fills the annular cavity inside the bulb to produce the vapor form of the fluid in the remainder of the annular cavity, and the coupling means is responsive to the pressure of the vapor form of the fluid.

9. The actuator of claim 1, in which the filler rod is made of Teflon.

10. The control device of claim 7, in which the filler rod is made of Teflon.

* * * * *

7250-LTR
PO-1050
(5/69)

UNITED STATES PATENT OFFICE
CERTIFICATE OF CORRECTION

Patent No. __3,772,877__     Dated __November 20, 1973__

Inventor(s) __Harry Friedland__

It is certified that error appears in the above-identified patent and that said Letters Patent are hereby corrected as shown below:

Patent column 1, line 27, between "uid" and "partially" was omitted --and its equilibrium vapor pressure. A volatile liquid--.

Patent column 4, line 33, "aise" should be --raise--.

Patent column 5, line 35, between "source" and "is" should be inserted --93--.

Patent column 8, line 5, "nd" should be --and--.

Signed and sealed this 9th day of July 1974.

(SEAL)
Attest:

McCOY M. GIBSON, JR.
Attesting Officer

C. MARSHALL DANN
Commissioner of Patents